United States Patent [19]

Miura et al.

[11] Patent Number: 4,508,782
[45] Date of Patent: Apr. 2, 1985

[54] BASE FILM FOR MAGNETIC RECORDING TAPE WITH F-5 VALUES OF 9-15 KG/MM²

[75] Inventors: Yasuki Miura, Otsu; Masahiko Motegi, Hikone; Kazuo Okabe, Shiga, all of Japan

[73] Assignee: Toray Industries, Inc., Tokyo, Japan

[21] Appl. No.: 625,185

[22] Filed: Jun. 27, 1984

Related U.S. Application Data

[63] Continuation of Ser. No. 563,018, Dec. 19, 1983, abandoned, which is a continuation of Ser. No. 483,849, Apr. 15, 1983, abandoned, which is a continuation of Ser. No. 223,401, Jan. 8, 1981, abandoned.

[51] Int. Cl.³ .............................................. H01F 10/00
[52] U.S. Cl. .................................... 428/409; 428/694; 428/910
[58] Field of Search ............... 428/910, 694, 900, 328, 428/329, 409, 410; 264/175, 210.1, 210.6, 210.2; 427/128, 129

[56] References Cited

U.S. PATENT DOCUMENTS

| | | | |
|---|---|---|---|
| 3,821,156 | 6/1974 | Farrar | 260/40 R |
| 3,901,851 | 8/1975 | Kohno et al. | 428/336 |
| 3,958,064 | 5/1976 | Brekken | 428/458 |
| 3,967,025 | 6/1976 | Tanabe et al. | 428/155 |
| 4,071,654 | 1/1978 | Egama et al. | 428/336 |
| 4,153,920 | 5/1979 | Shirahata et al. | 428/409 |
| 4,190,689 | 2/1980 | Fujita et al. | 428/409 |
| 4,202,927 | 5/1980 | Afamaguchi et al. | 428/328 |
| 4,304,807 | 12/1981 | Kawakami et al. | 428/483 |
| 4,309,471 | 1/1982 | Suzuki et al. | 428/409 |

FOREIGN PATENT DOCUMENTS

| | | | |
|---|---|---|---|
| 2807147 | 9/1978 | Fed. Rep. of Germany . | |
| 54-155013 | 12/1979 | Japan | 428/694 |
| 1433344 | 4/1976 | United Kingdom | 428/910 |
| 2027615 | 2/1980 | United Kingdom | 428/694 |

*Primary Examiner*—Marion E. McCamish
*Attorney, Agent, or Firm*—Austin R. Miller

[57] ABSTRACT

A base film for a magnetic recording tape is provided, which possesses an F-5 value of 9-15 Kg/mm² as measured along both the longitudinal and transverse directions and in which the ratio of the average surface roughness to the particle size of included particles is $2.0 \times 10^{-3}$ to $5.1 \times 10^{-3}$. The average surface roughness is preferably 0.005-0.040 micron. The magnetic recording tape made therefrom exhibits an improved running property and an improved abrasion resistance as well as good surface characteristics.

7 Claims, No Drawings

BASE FILM FOR MAGNETIC RECORDING TAPE WITH F-5 VALUES OF 9-15 KG/MM²

This application is a continuation of application Ser. No. 563,018 filed Dec. 19, 1983, which is a continuation of Ser. No. 483,849, filed Apr. 15, 1983, which is a continuation of Ser. No. 223,401, filed Jan. 8, 1981, all abandoned.

BACKGROUND OF THE INVENTION

1. Field of the Invention

This invention relates to an improved base film for a magnetic recording tape, which is well-balanced in mechanical properties as measured along both the longitudinal and transverse directions. This base film exhibits a specified F-5 value as measured along both the longitudinal and transverse directions and a specified ratio of the average surface roughness to the average particle size of particles included therein. By the term "F-5 value" used herein is meant a tensile strength at an elongation of 5%.

2. Description of the Prior Art

A film composed mainly of a polyester, especially polyethylene terephthalate (hereinafter, for brevity, referred to as "PET"), which has been biaxially drawn and heat-set, is ordinarily used as the material of a base film for a magnetic recording tape. This film is roughly divided into a balanced type where the orientation and mechanical properties in the longitudinal direction are relatively similar to those in the transverse direction and a tensilized type where the orientation and mechanical properties are much higher in the longitudinal direction than in the transverse direction. A film of the balanced type is ordinarily prepared by drawing the film at a similar drawing ratio in both the longitudinal and transverse directions, and in the film of this type, the F-5 value is lower than 15 Kg/mm², more ordinarily lower than 13 Kg/mm², in both longitudinal and transverse directions. On the other hand, a tensilized film is prepared by drawing the film at the total drawing ratio in the longitudinal direction at a level much higher than the drawing ratio in the transverse direction, and the F-5 value is ordinarily larger than 15 Kg/mm² and in the range of 17 to 20 Kg/mm² in many cases.

Films of both these types have merits and demerits in the stiffness, dimensional stability, preparation easiness and cost, and one of these two types is appropriately selected according to the intended use.

Properties required for a base film for magnetic recording tape are the fineness and uniformity of protrusions on the film surface which are necessary for ensuring the uniformity and the smoothness of a magnetic material coating layer to be formed thereon, and the running property and abrasion resistance capable of resisting repeated use. These surface protrusions may ordinarily be formed by including protrusion-forming particles of an inorganic substance or a polymerinsoluble substance such as a catalyst residue (hereinafter, for brevity, referred to as "internal particles") into the film. However, the running property and abrasion resistance are properties contrary to the fineness and uniformity of the surface projections (hereinafter referred to as "surface characteristics"). In the film of the balanced type, the surface protrusions are ordinarily dependent upon the size and number of the included particles. For example, if a great number of large particles are included in the film, the running property and abrasion resistance can be improved, but the surface protrusions become coarse and fatal defects, such as omission of recording, i.e., increase in dropout, reduction of the output power and increase of the noise, are brought about in the resulting magnetic recording tape. On the other hand, if fine particles are included, fine surface protrusions are formed, and reduction of the output power and occurrence of the dropout phenomenon can be prevented, but the slip characteristic is degraded, resulting in reduction of the running property and abrasion resistance.

SUMMARY OF THE INVENTION

It is a primary object of the present invention to provide a base film for a magnetic tape in which the above-mentioned defects of the conventional base films are eliminated and both the running property and abrasion resistance and the surface characteristics are improved.

Other objects and advantages of the present invention will be apparent from the following description.

In accordance with the present invention, there is provided a base film for a magnetic recording tape, which possesses an F-5 value of from 9 to 15 Kg/mm² as measured along both the longitudinal and transverse directions, and in which the ratio of the average surface roughness to the particle size of included particles is from $2.0 \times 10^{-3}$ to $5.1 \times 10^{-3}$.

DESCRIPTION OF THE PREFERRED EMBODIMENTS

The present invention is directed to a so-called balanced type film in which the F-5 value is 9 to 15 Kg/mm² in both the longitudinal and transverse directions. When the F-5 value is smaller than 9 Kg/mm², undesirable elongation is caused in the magnetic tape by abnormal tension or the like occurring during running. In contrast, when the F-5 value exceeds 15 Kg/mm², the dimensional stability is degraded.

In order to obtain a good dimensional stability, it is preferable that the F-5 value be in the range of from 10 to 13 Kg/mm².

It is preferable that the average surface roughness be in the range of from 0.005 to 0.04 micron. If the average surface roughness exceeds 0.04 micron, the surface characteristics are degraded, and if the average surface roughness is smaller than 0.005 micron, the running property is degraded. Accordingly, too large or too small an average surface roughness is not preferred. Even if the ratio of the surface roughness to the average particle of included particles (hereinafter, for brevity, referred to as "roughness parameter") is within the range specified in the present invention, it is not always possible to greatly improve both the running property and abrasion resistance and the surface characteristics.

For optimum results, the average surface roughness is not larger than 0.030 micron, more preferably not larger than 0.025 micron. If the average surface roughness is not larger than 0.030 micron, the output characteristics of the tape is further improved and if the average surface roughness is not larger than 0.025 micron, the effect of preventing the dropout phenomenon is further enhanced.

It is indispensable that the roughness parameter should not be higher than $5.1 \times 10^{-3}$, preferably not higher than $4.6 \times 10^{-3}$ and more preferably not higher than $4.1 \times 10^{-3}$. If the roughness parameter exceeds $5.1 \times 10^{-3}$, it is impossible to improve to the desired extent both the running property and abrasion resistance and the surface characteristics. More specifically, if the roughness parameter is not higher than $5.1 \times 10^{-3}$, the resulting tape is excellent in the above-mentioned properties, and if the roughness parameter is not higher than $4.6 \times 10^{-3}$, the dropout reduction and the output increase of the tape can further be improved.

In conventional balanced type films, the roughness parameter is ordinarily in the range of from $5.3 \times 10^{-3}$ to $5.7 \times 10^{-3}$ or higher. If the roughness parameter is reduced to a level not higher than $5.1 \times 10^{-3}$ as in the present invention, this means that the size of included particles is increased when the surface roughness is the same and the surface roughness is made finer when the particle size of included particles is the same. If the roughness parameter exceeds the upper limit of $5.1 \times 10^{-3}$, the intended improvement in both the running property and abrasion resistance and the surface characteristics cannot be attained. In general, the lower the roughness parameter, the more enhanced the above-mentioned, intended effect. However, the roughness parameter should be at least $2.0 \times 10^{-3}$. If the roughness parameter is lower than $2.0 \times 10^{-3}$, the running property and abrasion resistance cannot be improved.

The film of the present invention should preferably be a biaxially drawn polyester film having properties required for a base film for magnetic recording tapes.

To produce magnetic recording tape utilizing the base film of the present invention various known magnetic layers, such as a magnetic layer composed of magnetic particles in a binder and a binder-free magnetic layer comprising a layer of a magnetic metal formed on a base film by vacuum evaporation deposition or electroplating, can be used.

The process for preparing the film of the present invention will now be described.

The base film of the present invention is prepared by a process wherein polyester having fine particles included therein is melt-extruded from a slit die to form an undrawn film and, if necessary a super-drawn film not substantially oriented is formed from said film. Then, the undrawn film or the super-drawn film is biaxially drawn in both the longitudinal and transverse directions at a draw ratio of from 2.0 to 4.5 at a temperature in the range of from the glass transition temperature of the polymer to 170° C., and then, the drawn film is heat-treated at a temperature of from 150° to 230° C. In the biaxial drawing process, the surface protrusions of the film should be pressed down by means of calendering to adjust the surface conditions of the base film.

As the polyester that is used in the present invention, there can be mentioned, a homopolyester, a copolyester and a mixed polymer containing at least 70% by weight of such homopolyester or copolyester. Polyethylene terephthalate and polyethylene-2,6-naphthalate are especially preferred as the polyester type polymer.

The surface protrusions may ordinarily be formed by including protrusion-forming particles of an organic substance ("external particles") or a polymer-insoluble substance such as a catalyst residue ("internal particles") into the film.

As the fine particles to be included into the base film, there may be used external particles comprised of inorganic particles such as $CaCO_3$, $SiO_2$, $Al_2O_3$ and calcium phosphate and internal particles containing metal components such as Ca, Si and P, and the kinds of particles used in the present invention are not particularly critical. A combination of external particles and internal particles of the Ca-Li-P series is preferably used. The particle size is preferably in the range of from 1 to 8 microns as measured according to the dark-field illumination microscope method, and the amount of the particles incorporated is preferably in the range of from 0.025 to 0.5% by weight.

It is preferable that the calender treatment be carried out under conditions of a roll temperature of from 80° to 150° C. and a linear roll pressure of 300 to 1,000 Kg/cm.

The method of adjusting the surface condition of the film in the present invention is not limited to the above-mentioned calender method. A method of the adjusting the surface condition of the film by a combination of the special drawing and heat treatments may be employed.

The above-mentioned parameters are determined according to the following methods.

(1) F-5 Value:

The F-5 value is determined according to ASTM D-882.

(2) Average Surface Roughness:

The average surface roughness is expressed by the average roughness Ra measured at a cut-off length of 0.25 mm by a contact feeler type surface roughness meter (HOMMEL TESTER Model T10) specified according to DIN 4768. The diameter of the top end of the contact feeler is 10 microns.

(3) Roughness Parameter:

The roughness parameter is expressed by the ratio of the above Ra value to the average particle size of included particles measured according to the following method.

The film is molten and rapidly cooled in a very narrow space between preparing glass sheets, and particles having a diameter of at least 1 micron are observed by microscope under the dark-field illumination in the transmission state and the average particle size is calculated. The magnifying power is 128 times, and the average size is expressed by the volume average size. Under the dark-field illumination, the particle size is seen as large as 2.4 times the true particle size observed under the ordinary light-field illumination. In the present invention, the particle size is expressed by the particle size measured under the dark-field illumination.

The present invention will now be described in detail with reference to the following examples that by no means limit the scope of the invention. Parts and percents are by weight unless otherwise specified.

COMPARATIVE EXAMPLE 1

The particle size of kaolin as an inorganic material was adjusted by pulverization and classification to obtain particles having an average particle size of 1.5 microns. Polyethylene terephthalate (hereinafter, for brevity, referred to as "PET") having an intrinsic viscosity [$\eta$] of 0.65 and containing 0.2% of the above particles included therein was prepared by polymerization according to a conventional procedure. The formed PET was extruded, cooled and biaxially drawn according to conventional procedures to obtain a film. The drawing ratio in the longitudinal direction was 3.4 and the drawing ratio in the transverse direction was 3.6; the drawing temperature in the longitudinal direction was 90° C. and the drawing temperature in the transverse direction was 100° C. The heat treatment was conducted at 200° C. The thickness of the obtained film was 15 microns. A video tape was prepared from this film according to customary procedures. Properties of the tape are shown in Table I, below.

From the results shown in Table I, it is seen that the running property and abrasion resistance of the product of Comparative Example 1 were poor, and it was very difficult to obtain a good running property and abrasion resistance simultaneously with a good surface characteristics.

COMPARATIVE EXAMPLE 2

A film was prepared in the same manner as described in Comparative Example 1 except that the average particle size of the particles was changed to 2.5 microns. Properties of a tape prepared from this film are shown in Table I, below. From the results shown in Table I, it is seen that the surface roughness varied depending upon the size of the included particles and the running property was somewhat improved but the output characteristic and dropout level were not satisfactory, and thus it was difficult to obtain a good running property and abrasion resistance simultaneously with good surface characteristics.

COMPARATIVE EXAMPLE 3

A film was prepared in the same manner as described in Comparative Example 1 except that the average particle size of the particles used was changed to 3.5 microns. Properties of a tape prepared from this film are shown in Table I, below. From the results shown in Table I, it is seen that the running property and abrasion resistance were improved but the output characteristic and dropout level were drastically deteriorated and thus it was difficult to obtain a good running property and abrasion resistance simultaneously with good surface characteristics.

EXAMPLE 1

A film was prepared by using the same starting materials in the same manner as described in Comparative Example 2 except that during the drawing in the longitudinal direction, the film surface was pressed at 100° C. under a linear pressure of 300 Kg/cm to effect a calender treatment. The average surface roughness of the so obtained film was very small. A video tape was prepared from this film according to customary procedures. Properties of the obtained tape are shown in Table I, below.

It was found that in the product of Example 1, the running property and abrasion resistance were maintained at good levels, though the surface roughness was very small, and the product was very suitable as a magnetic recording material.

EXAMPLE 2

A film was prepared by using the same starting materials in the same manner as described in Comparative Example 3 except that the surface of the film was pressed at 100° C. under linear pressure of 300 Kg/cm during the drawing in the longitudinal direction to effect a calender treatment. A tape was prepared from this film according to customary procedures. Properties of the obtained tape are shown in Table I, below.

It was found that in the product of Example 2, all of the surface characteristics, running property and abrasion resistance were highly enhanced.

COMPARATIVE EXAMPLE 4

An ester exchange reaction of 100 parts of dimethyl terephthalate and 70 parts of ethylene glycol was carried out in the presence of 0.035 part of manganese acetate as a catalyst according to customary procedures. Then, 0.04 part of antimony trioxide, 0.15 part of lithium acetate dissolved in ethylene glycol, 0.09 part of calcium acetate and 0.03 part of calcium carbonate having an average particle size of 2.0 microns, which was uniformly dispersed in ethylene glycol, were added to the reaction product, and 0.13 part of trimethyl phosphate was added and a polycondensation reaction was carried out to obtain PET having an intrinsic viscosity $[\eta]$ of 0.65 and a softening point of 259.7° C.

The so obtained PET was melt-extruded at 290° C. into a balanced type film by biaxial drawing. Drawing in the longitudinal direction was carried out at a drawing ratio of 3.4 at a temperature of 90° C. and drawing in the transverse direction was carried out at a drawing ratio of 3.6 at a temperature of 100° C. The heat treatment was carried out at 200° C.

Properties of the so obtained film and a tape prepared from this film are shown in Table I, below.

It is seen that the roughness parameter of the film was large, and, therefore, the output characteristic of the tape was reduced.

EXAMPLE 3

A film was prepared by using the same materials in the same manner as described in Comparative Example 4, except that a calender treatment was carried out at 90° C. under a linear roll pressure of 500 Kg/cm by using nip rollers during in the first drawing in the longitudinal direction. Properties of a tape prepared from this film are shown in Table I, below. It is seen that all the properties of the resulting tape were excellent.

COMPARATIVE EXAMPLE 5

A film having a thickness of 15 microns was prepared by using the same materials in the same manner as described in Comparative Example 4, except that the F-5 value was relatively increased in the longitudinal direction as compared with that in the transverse direction. In this case, the first drawing in the longitudinal direction was carried out at drawing ratio of 3.2 at 90° C. and the drawing in the transverse direction was carried out at a drawing ratio of 3.6 at 120° C. The second drawing in the longitudinal direction was carried out at a drawing ratio of 1.2 at 130° C. The heat treatment was carried out 200° C.

Properties of the so obtained film and a tape prepared from this film are shown in Table 1, below. It is seen that the output characteristic of the tape was reduced, as in the case of the tape of Comparative Example 4.

EXAMPLE 4

A film was prepared by using the same materials in the same manner as described in Comparative Example 5, except that during the first drawing in the longitudinal direction, the calender treatment was carried out at 90° C. under a linear pressure of 500 Kg/cm by using nip rollers. Properties of a tape prepared from this film are shown in Table I, below. It is seen that the tape was excellent in all of the output characteristic, dropout level, running property and abrasion resistance.

TABLE I

| | Properties of Film | | | | Properties of Tape | | |
|---|---|---|---|---|---|---|---|
| | F-5 Value (Kg/mm$^2$) | | | Roughness | Output | Dropout | Running Property and |
| | MD | TD | Ra(micron) | Parameter($\times 10^{-3}$) | Characteristic | Level | Abrasion Resistance |
| Comparative Example 1 | 11.8 | 12.0 | 0.029 | 5.7 | B | B | D |
| Comparative Example 2 | 12.0 | 11.9 | 0.044 | 6.0 | E | C | B |
| Comparative Example 3 | 11.9 | 12.2 | 0.058 | 5.5 | G | D | A |
| Example 1 | 11.9 | 12.0 | 0.029 | 4.5 | B | A~B | A |
| Example 2 | 12.1 | 12.1 | 0.039 | 4.5 | C | B | A |
| Comparative Example 4 | 12.0 | 12.4 | 0.035 | 5.6 | D | B | B |
| Example 3 | 12.2 | 12.0 | 0.024 | 4.2 | B | A | A |
| Comparative Example 5 | 13.0 | 11.0 | 0.034 | 5.4 | D | B | B |
| Example 4 | 13.1 | 10.9 | 0.021 | 3.7 | A | A | A |

Note
MD: longitudinal direction
TD: transverse direction

In determining the tape properties shown in Table I, a sample tape was cut into a ½ inch width and applied to a video tape recorder (VHS manufactured and supplied by Victor) and properties were evaluated according to the following scales.

(1) Output Characteristic:
The tapes were ranked by chroma S/N by using the tape of Comparative Example 2 as the reference tape.
A: above +2 dB
B: +1.5 to +2 dB
C: +1.0 to +1.5 dB
D: +0.5 to +1.0 dB
E: 0 to +0.5 dB
F: −0.5 to 0 dB
G: below −0.5 dB (2) Dropout Level:
The number of dropouts continuing for more than 15 microseconds was counted.
A: less than 10 dropouts per minute
B: 10 to 20 dropouts per minute
C: 20 to 50 dropouts per minute
D: more than 50 dropouts per minutes (3) Running Property and Abrasion Resistance:
The tape was travelled on a recorder 500 times, and the film was ranked based on the running state and the state of damages on the film after the running test.
A: Excellent
B: Good
C: Moderate
D: Poor

We claim:

1. A biaxially oriented polyester base film for a magnetic recording tape, which possesses an F-5 value of from 9 to 15 Kg/mm$^2$ as measured along both the longitudinal and transverse directions, and for which the ratio of the average surface roughness when expressed as microns to the average particle size of included particles, when expressed as microns and measured under dark field illumination, is from $2.0 \times 10^{-3}$ to $5.1 \times 10^{-3}$, and said average surface roughness is from 0.005 to 0.040 micron.

2. A base film for a magnetic recording tape according to claim 1, wherein the average surface roughness is from 0.005 to 0.030 micron.

3. A base film for a magnetic recording tape according to claim 1, wherein the average surface roughness is from 0.005 to 0.025 micron.

4. A base film for a magnetic recording tape according to any one of claims 1 through 3, wherein the ratio of the average surface roughness to the average particle size of included particles is from $2.0 \times 10^{-3}$ to $4.6 \times 10^{-3}$.

5. A base film for a magnetic recording tape according to claim 4, wherein the ratio of the average surface roughness to the average particle size of included particles is from $2.0 \times 10^{-3}$ to $4.1 \times 10^{-3}$.

6. A base film for a magnetic recording tape according to claim 1, wherein the F-5 value is from 10 to 13 Kg/mm$^2$.

7. A base film for a magnetic recording tape according to claim 1, wherein the material of the film is polyethylene terephthalate.

* * * * *